(12) United States Patent
Yu

(10) Patent No.: US 8,165,173 B2
(45) Date of Patent: Apr. 24, 2012

(54) DATA TRANSMISSION METHOD, SYSTEM AND TERMINAL

(75) Inventor: Yang Yu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 305 days.

(21) Appl. No.: 12/532,925

(22) PCT Filed: Jul. 30, 2007

(86) PCT No.: PCT/CN2007/070381
§ 371 (c)(1),
(2), (4) Date: Sep. 24, 2009

(87) PCT Pub. No.: WO2008/122178
PCT Pub. Date: Oct. 16, 2008

(65) Prior Publication Data
US 2010/0111116 A1    May 6, 2010

(30) Foreign Application Priority Data
Apr. 6, 2007   (CN) .......................... 2007 1 0090420

(51) Int. Cl.
*H04J 3/06* (2006.01)
(52) U.S. Cl. ....................................... 370/503
(58) Field of Classification Search .................. 370/503, 370/464–514
See application file for complete search history.

(56) References Cited

U.S. PATENT DOCUMENTS

| | | | |
|---|---|---|---|
| 5,539,783 A | | 7/1996 | Papson |
| 5,883,901 A | * | 3/1999 | Chiu et al. .................... 370/508 |
| 6,018,664 A | | 1/2000 | Skarin |
| 6,449,291 B1 | * | 9/2002 | Burns et al. .................... 370/516 |
| 7,187,669 B1 | | 3/2007 | Lee |
| 7,587,746 B1 | * | 9/2009 | Schwartzman et al. ...... 725/111 |

(Continued)

FOREIGN PATENT DOCUMENTS

| CN | 1206259 A | 1/1999 |
|---|---|---|
| EP | 1 025 728 B1 | 8/2000 |

OTHER PUBLICATIONS

International Search Report: PCT/CN2007/070381.

*Primary Examiner* — Kwang B Yao
*Assistant Examiner* — Juvena Loo
(74) *Attorney, Agent, or Firm* — Ladas & Parry LLP

(57) ABSTRACT

Embodiments of the present invention disclose a data transmission method, a data transmission system and a CLT. The method being applicable to a semi-duplex Ethernet Passive Coaxial-cable Network and the network comprising a CLT and at least one CNU; the CLT transmitting downlink data to each CNU in a preset downlink transmission period and each CNU transmitting uplink data to the CLT in a preset uplink transmission period; the preset uplink transmission period being shorter or equal to the period that clock synchronization can be kept by the CNU. The method includes: sending, by the CLT, clock information to the CNU before the expiration of the period that the clock synchronization can be kept by the CNU, the clock information being adapted to make the clocks of the CNU and CLT be kept synchronized with each other within a period. With the embodiments of the present invention, the clock between each CNU and the CLT can be kept synchronized. Thus, the normal communication between the CNU and the CLT is guaranteed.

11 Claims, 3 Drawing Sheets

U.S. PATENT DOCUMENTS

| | | |
|---|---|---|
| 2001/0017864 A1 | 8/2001 | Stobart |
| 2002/0142785 A1 | 10/2002 | Park et al. |
| 2004/0252678 A1* | 12/2004 | Rabenko et al. ............. 370/352 |
| 2005/0175040 A1* | 8/2005 | Holborow .................... 370/509 |
| 2006/0133398 A1* | 6/2006 | Choi et al. ................... 370/412 |
| 2007/0201698 A1 | 8/2007 | Huh et al. |
| 2008/0062889 A1 | 3/2008 | Azenko et al. |
| 2009/0059859 A1 | 3/2009 | Kuze et al. |
| 2009/0279565 A1 | 11/2009 | Kamath et al. |
| 2010/0031303 A1 | 2/2010 | Yu et al. |

* cited by examiner

DATA TRANSMISSION METHOD, SYSTEM AND TERMINAL

FIELD OF THE INVENTION

The present invention relates to Ethernet communication technologies, and more particularly, to a data transmission method, system and terminal.

BACKGROUND OF THE INVENTION

The Ethernet Passive Optical Network (EPON) is an access technology obtained by combining a passive optical network technology and Ethernet technology. The EPON system mainly includes an Optical Line Terminal (OLT), Optical Distribution Network (ODN) and Optical Network Unit (ONU). The OLT connects with one or more ODNs which are passive optical splitters and used for transmitting downlink data from the OLT to a plurality of ONUs via an optical distributor and transmitting uplink data from the ONUs to the OLT via convergence. Wherein, the data transmission is in a passive optical fiber transmission mode.

At present, an Ethernet Passive Coaxial-cable Network (EPCN) system is developed with reference to the network structure of the EPON system. The EPCN system takes the Ethernet as a carrier, adopts point-to-multipoint structure and a passive Coaxial-cable transmission mode, where uplink data streams are transmitted in a burst Ethernet packets. FIG. 1 is a schematic diagram illustrating structure of the EPCN system. As illustrated in FIG. 1, the EPCN system mainly includes a Coaxial-cable Line Terminal (CLT), a brancher/distributor, and Coaxial-Cable Network Units (CNUs). The EPCN connects with various Ethernet devices via the CLT and connects with user equipment via the CNUs. The EPCN system may be applied to various service environments. At present, the most commonly application of the EPCN system is to provide Ethernet Broad Band accessing service to home users.

The EPCN system is generally used as a semi-duplex system. In such a case, transmission mediums shared by an uplink and downlink are occupied by the downlink from the CLT to each CNU and the uplink from each CNU to the CLT in time-sharing. That is to say, in the downlink transmission period, the CLT transmits downlink data to each CNU, while each CNU does not transmit any information to the CLT, and in the uplink transmission period, each CNU transmits uplink data to the CLT, while the CLT does not transmit any information to each CNU.

In the EPCN system, in order to guarantee normal communication between the CLT and each CNU, a clock of each CNU must be kept synchronous with that of the CLT. However, the ability of each CNU to keep the clock is limited. The CNU generally can guarantee accuracy of its clock in a period from 10 ms to several hundreds ms. If each CNU can not receive clock information from the CLT within the period that the clock synchronization can be kept, there will be an error in the clock kept by the CNU and the clock of each CNU and that of the CLT will not be synchronous, resulting in that each CNU can not perform normal communication with the CLT and Quality of Services (QoS) greatly reduces.

SUMMARY OF THE INVENTION

An embodiment of the present invention provides a data transmission method, another embodiment of the present invention provides a data transmission system, another embodiment of the present invention provides a CLT, in order to guarantee that the clock of each CNU and that of the CLT can be kept synchronous.

According to an embodiment of the present invention, a data transmission method is provided. The method being applicable to a semi-duplex Ethernet Passive Coaxial-cable Network and the network comprising a CLT, Coaxial-cable Line Terminal, and at least one CNU, Coaxial-cable Network Unit; the CLT transmitting downlink data to each CNU in a preset downlink transmission period and each CNU transmitting uplink data to the CLT in a preset uplink transmission period; the preset uplink transmission period being shorter or equal to the period that clock synchronization can be kept by the CNU;

the method includes:

sending, by the CLT, clock information to the CNU before the expiration of the period that the clock synchronization can be kept by the CNU, the clock information being adapted to make the clocks of the CNU and CLT be kept synchronized with each other within a period.

According to another embodiment of the present invention, a data transmission system is provided. The system includes:

more than one CNU, Coaxial-cable Network Unit, adapted to transmit uplink data in a preset uplink transmission period, which is shorter or equal to a period that clock synchronization can be kept by each CNU; and a CLT, Coaxial-cable Line Terminal, adapted to transmit downlink data in a downlink transmission period, send clock information to the CNU before the expiration of the period that the clock synchronization can be kept by the CNU, the clock information being adapted to make the clocks of the CNU and CLT be kept synchronized with each other within a period.

According to still another embodiment of the present invention, a CLT, Coaxial-cable Line Terminal, is provided. The CLT includes:

a clock processing unit, adapted to send a transmitting triggering notification to a data receiving and transmitting processing unit when detecting the starting of a downlink transmission period, and send a receiving triggering notification to the data receiving and transmitting processing unit when detecting the starting of an uplink transmission period, the uplink transmission period being shorter or equal to a period that a clock synchronization can be kept by a CNU, Coaxial-cable Network Unit; and the data receiving and transmitting processing unit, adapted to send downlink data which carried clock information to the CNU after receiving the transmitting triggering notification, and receiving uplink data sent from the CNU after receiving the receiving triggering notification, the clock information being adapted to make the clocks of the CNU and CLT be kept synchronized with each other within a period.

DETAILED DESCRIPTION OF THE INVENTION

In order to make objectives, technical solutions and advantages of the present invention clearer, the present invention will be described in detail hereinafter with reference to accompanying drawings.

When the EPCN system is used as a semi-duplex system, transmission mediums are occupied by each CNU and CLT in time-sharing. That is to say, in an uplink transmission period, the CLT can not transmit any information. In such a case, each CNU can not receive clock information sent from the CLT in the uplink transmission period. On the other hand, the ability of each CNU to keep the clock is limited. If time length in which the CNU does not receive the clock information from the CLT exceeds that of the period that the clock synchronization can be kept by the CNU, there will be an error in the clock of the CNU.

As for characteristics mentioned above, it can be guaranteed that the clock of the CNU can be kept synchronous with that of the CLT which guarantees the accuracy of the clock as long as the time length in which the CNU does not receive the clock information sent from the CLT is not larger than that of the period that the clock synchronization can be kept by the CNU. All downlink information sent from the CLT includes the clock information. Thus, it only needs to guarantee that a downlink transmission period begins before expiration of the period that the clock synchronization can be kept by the CNU, i.e. an uplink transmission period ends before the expiration of the period that the clock synchronization can be kept by the CNU if the time length in which the CNU does not receive the clock information sent from the CLT is to be made not longer than that of period that the clock synchronization can be kept by the CNU.

Thus, an embodiment of the present invention provides a data transmission method. In this method, an uplink transmission period which is shorter or equal to the period that the clock synchronization can be kept by each CNU is set. Each CNU transmits uplink data in the uplink transmission period.

Figure 1:
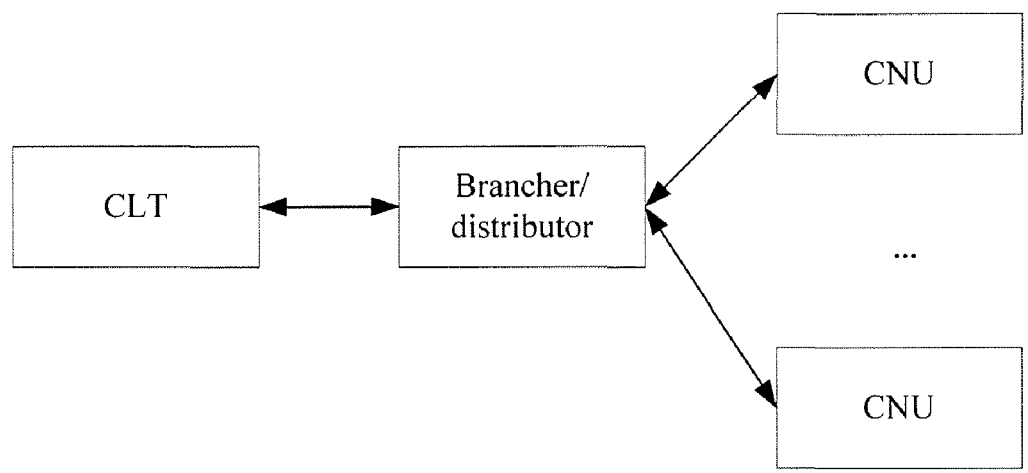
FIG. 1 is a schematic diagram illustrating structure of an EPCN system.
Figure 2:
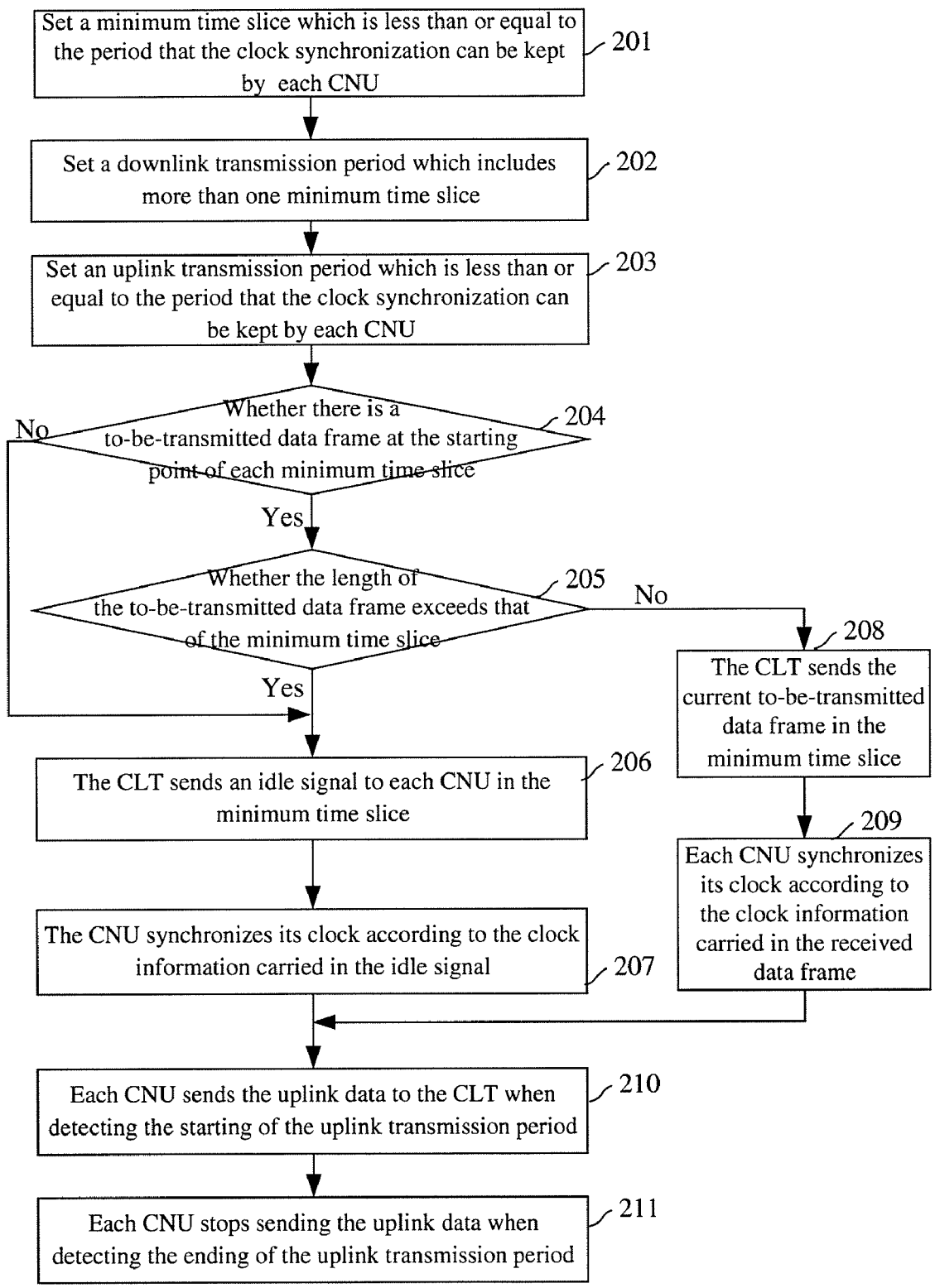
FIG. 2 is a simplified flow chart illustrating data transmission in accordance with an embodiment of the present invention.

FIG. 2 is a simplified flow chart illustrating data transmission in accordance with an embodiment of the present invention. As shown in FIG. 2, in an embodiment of the present invention, a process for performing the data transmission includes the following processes.

Block 201: A minimum time slice which is shorter or equal to the period that the clock synchronization can be kept by each CNU is set.

Block 202: A downlink transmission period which includes more than one minimum time slice is set.

Block 203: An uplink transmission period which is shorter or equal to the period that the clock synchronization can be kept by each CNU is set.

Here, the uplink transmission period can be set in the following modes:

Mode one: The uplink transmission period is set in each CNU by a manager according to the period that the clock synchronization can be kept by each CNU.

Mode two: The CLT first obtains the length of the period that the clock synchronization can be kept by each CNU, and then sets the uplink transmission period according to the obtained length of the period that the clock synchronization can be kept by each CNU. The length of the period that the clock synchronization can be kept by each CNU can be obtained in the following modes: the manager directly inputs the length of the period that the clock synchronization can be kept by each CNU in the CLT, or each CNU sends information about the length of the period that the clock synchronization can be kept by each CNU to the CLT.

In the mode two, each CNU may send length of each to-be-transmitted uplink data frame to the CLT. In such a case, the CLT may further set the uplink transmission period according to the uplink data frame to be transmitted by each CNU. That is to say, both the length of the period that the clock synchronization can be kept by each CNU and the length of each uplink data frame to be transmitted by each CNU are taken into consideration by the CLT when setting the uplink transmission period.

In the mode two, the CLT further needs to transmit information about the set uplink transmission period to each CNU via an existing or newly-defined control message between the CLT and each CNU.

In Block 203, it can be achieved that the uplink transmission period is shorter or equal to the period that the clock synchronization can be kept by each CNU via setting the uplink transmission period as being equal to the minimum clock slice set in Block 201.

It should be noted that in Blocks 201 to 203, the uplink and downlink transmission periods can be set via the minimum time slice. The length of the downlink transmission period may be set of several times of that of the uplink transmission period, and it is convenient for the updating the uplink and downlink transmission periods via the minimum time slice in the following processes. For instance, if the length of the period that the clock synchronization can be kept by each CNU is 10 ms, the minimum time slice may be set as 5 ms in Block 201. If the ratio between the length of the downlink transmission period and that of the uplink transmission period is four to one, the downlink transmission period may be set as 20 ms in Block 202 and the uplink transmission period may be set as 5 ms in Block 203.

Block 204: The CLT monitors the starting of the downlink transmission period and determines whether there is a to-be-transmitted data frame at the starting point of each minimum time slice of the downlink transmission period. If there is a to-be-transmitted data frame, Block 205 is performed; otherwise, Block 206 is performed.

Here, the minimum time slice is shorter or equal to the period that the clock synchronization can be kept by each CNU, which reflects the ability of each CNU to keep the clock. In order to guarantee that the CNU can receive the downlink information sent from the CLT before the expiration of the period that the clock synchronization can be kept by the CNU each time in the downlink transmission period, the downlink transmission period can be divided into minimum time slices. That is to say, the CLT needs to determine where there is a to-be-transmitted data frame in each minimum time slice of the downlink transmission period. If there is not a to-be-transmitted data frame, the processing of sending an idle signal needs to be performed. Thus, it is guaranteed that the CNU can receive the downlink information sent from the CLT before the expiration of the period that the clock synchronization can be kept by the CNU each time, and synchronize its clock with the downlink information.

Block 205: The CLT determines whether the length of the to-be-transmitted data frame exceeds that of the minimum time slice. If yes, Block 206 is performed; otherwise Block 208 is performed.

Since the length of an Ethernet data frame is non-fixed, a transmission time length of each data frame is non-fixed. The CLT can calculate the transmission time length of the data frame according to the length of the data frame. If the transmission time length of the data frame is larger than the that of the minimum time slice, the transmission of the data frame will be likely to occupy the uplink transmission time of the CNU, resulting in that the transmission mediums shared by the uplink and downlink are occupied by the CNU and CLT simultaneously and there is an error in the data transmission. Thus, preferably, in order to further guarantee that the data can be correctly transmitted in any cases, the determination of whether the transmission time length of the data frame exceeds the length of the preset minimum time slice should be performed before the CLT sends each data frame in this Block. If yes, the data frame will not be sent out, while the idle signal is sent to the CNU to help CNU to synchronize the clock.

Block 206: The CLT sends the idle signal to each CNU in the minimum time slice.

Block 207: Each CNU synchronizes its clock according to the clock information carried in the idle signal, and then Block 210 is performed.

Block 208: The CLT sends the current to-be-transmitted data frame in the minimum time slice.

Block 209: Each CNU synchronizes its clock according to the clock information carried in the received data frame.

Block 210: Each CNU sends the uplink data to the CLT when detecting the starting of the uplink transmission period.

Block 211: Each CNU stops sending the uplink data when detecting the ending of the uplink transmission period.

An embodiment of the present invention further provides a data transmission system. The system includes a CLT and more than one CNU.

Each CNU is adapted to transmit uplink data in an uplink transmission period, which is shorter or equal to period that clock synchronization can be kept by the CNU.

The CLT is adapted to send downlink data in a downlink transmission period.

In the system of the present invention, the CLT may be used for executing the processing of setting the uplink transmission period. Specifically, the processing includes: the CLT further obtains the length of the period that the clock synchronization can be kept by the CNU, and sets the uplink transmission period, the length of which is less than or equal to the length of the period that the clock synchronization can be kept by the CNU, and sends information about the set uplink transmission period to the CNU via an existing or newly-defined control signal between the CLT and the CNU.

Figure 3:
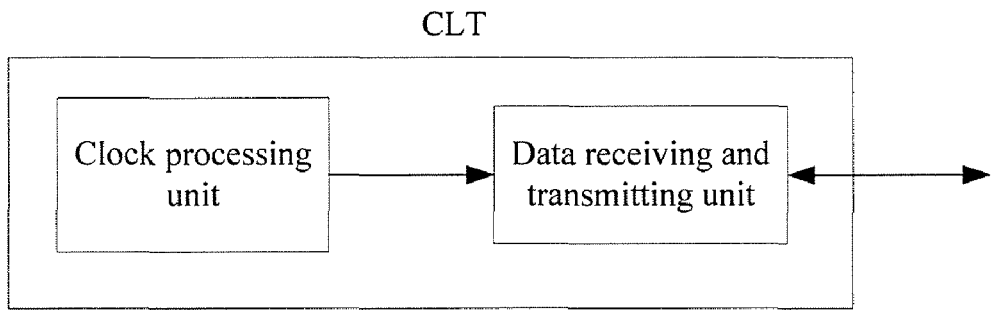
FIG. 3 is a schematic diagram illustrating internal structure of a CLT in accordance with an embodiment of the present invention.

Accordingly, an embodiment of the present invention further provides a CLT. FIG. 3 is a schematic diagram illustrating internal structure of a CLT in accordance with an embodiment of the present invention. As illustrated in FIG. 3, the CLT includes a clock processing unit and a data receiving and transmitting processing unit.

The clock processing unit is adapted to send a transmitting triggering notification to the data receiving and transmitting processing unit when detecting the starting of a downlink transmission period, and send a receiving triggering notification to the data receiving and transmitting processing unit when detecting the starting of an uplink transmission period. Wherein, the uplink transmission period is shorter or equal to the period that the clock synchronization can be kept by each CNU.

The data receiving and transmitting processing unit is adapted to send downlink data to the CNU upon the receipt of the transmitting triggering notification and receive uplink data sent from more than one CNU after receiving the receiving triggering notification.

Refer to FIG. 3, in the CLT provided by an embodiment of the present invention, in order to guarantee that each CNU can synchronize its clock according to downlink information sent from the CLT regardless of whether there is to-be-transmitted downlink data in the CLT in the downlink transmission period, the data receiving and transmitting processing unit is further adapted to determine whether there is a to-be-transmitted data frame at the starting point of each minimum time slice of the downlink transmission period after receiving the transmitting triggering notification. If yes, the data receiving and transmitting processing unit sends the data frame to the CNU; otherwise sends an idle signal to the CNU in the minimum time slice. The minimum time slice is shorter or equal to the period that the clock synchronization can be kept by the CNU.

Preferably, in the CLT provided by the embodiment of the present invention, the data receiving and transmitting processing unit is further adapted to determine whether transmission time length of the current to-be-transmitted data frame exceeds the length of the minimum time slice after determining that there is a to-be-transmitted data frame at the starting point of each minimum time slice. If yes, the data receiving and transmitting processing unit sends an idle signal to the CNU in the minimum time slice; otherwise keeps on executing the processing of sending the data frame to the CNU.

The CLT provided by the embodiment of the present invention is further adapted to accomplish the processing of setting the uplink transmission period. The processing includes: the clock processing unit is further adapted to obtain the length of the period that the clock synchronization can be kept by the CNU, set the uplink transmission period the length of which is less than or equal to the length of the period that the clock synchronization can be kept by the CNU, and send information about the set uplink transmission period to the data receiving and transmitting processing unit.

The data receiving and transmitting processing unit is further adapted to send the received information of the uplink transmission period to the CNU via an existing or newly-defined control message between the data receiving and transmitting processing and the CNU.

Figure 4:
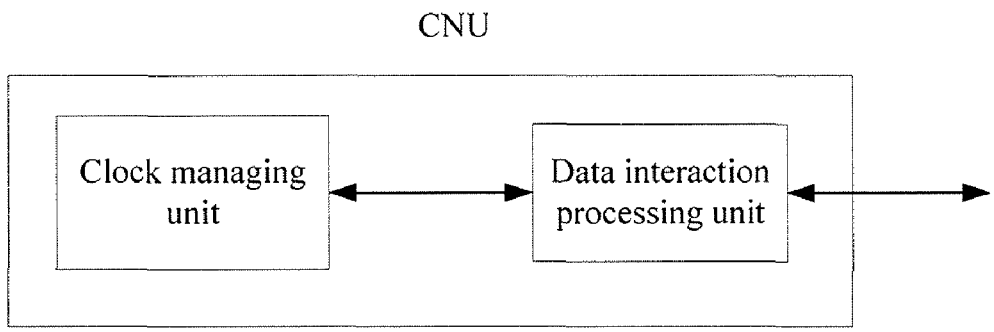
FIG. 4 is a schematic diagram illustrating basic internal structure of a CNU in accordance with an embodiment of the present invention.

Accordingly, an embodiment of the present invention further provides a CNU. FIG. 4 is a schematic diagram illustrating basic internal structure of a CNU in accordance with an embodiment of the present invention. Refer to FIG. 4, in the embodiment of the present invention, the CNU includes a clock managing unit and a data interaction processing unit.

The clock managing unit is adapted to save information about the uplink transmission period, send a transmitting triggering notification to the data interaction processing unit after detecting the starting of the uplink transmission period, and send a receiving trigger notification to the data interaction processing unit after detecting the ending of the uplink transmission period. The length of the uplink transmission period is less than or equal to length of the period that the clock synchronization can be kept by the CNU.

The data interaction processing unit is adapted to send uplink data to the CLT after receiving the transmitting trigger notification, and receiving downlink information sent from the CLT after receiving the receiving triggering notification.

Figure 5:
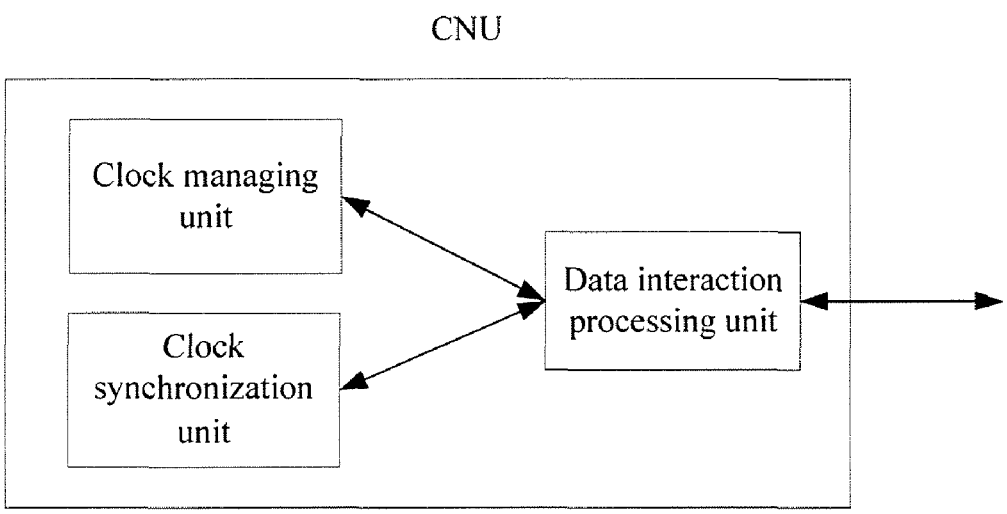
FIG. 5 is a schematic diagram illustrating preferable internal structure of a CNU in accordance with an embodiment of the present invention.

FIG. 5 is a schematic diagram illustrating preferable internal structure of a CNU provided by an embodiment of the present invention. Refer to FIG. 5, preferably, the CNU provided by the embodiment of the present invention may further include a clock synchronization unit, adapted to update clock information saved in local according to clock information received from the data interaction processing unit.

The data interaction processing unit is further adapted to extract the clock information from downlink information after receiving the downlink information sent from the CLT, send the extracted clock information to the clock synchronization unit, and transmit and receive data according to the clock information saved in the clock synchronization unit.

Seen from the description in the above-mentioned embodiments, a person skilled in the art of the present invention can clearly know that embodiments of the present invention can be achieved via software and universal and generalized computer devices (which can be considered as a hardware platform with a certain generality) capable of running the software. Certainly, the embodiments of the present invention can also be implemented by a mode of hardware design. But under many circumstances, the former is a preferred embodiment mode. Based on such understanding, the substantial part of the technical scheme of the present invention or the part contributing to the conventional method is embodied with software products. The software products are stored in a storage medium. The software products include some instructions which are used for making the universal hardware platform execute the methods disclosed in the embodiments of the present invention It can be seen from the embodiments of the present invention that, since the uplink transmission period is shorter or equal to the period that the clock synchronization can be kept by each CNU, it can be guaranteed that the uplink transmission period expires before the expiration of the period that the clock synchronization can be kept by each CNU, i.e. the downlink transmission period starts before the expiration of the period that the clock synchronization can be kept by each CNU clock. Thus, the CLT can send the downlink information carrying the clock information to each CNU before the expiration of the period that the clock synchronization can be kept by each CNU, and each CNU can synchronize its clock before the expiration of the period that the clock synchronization can be kept by the CNU. Therefore, the clock of each CNU can be kept synchronous with that of the CLT, by which the normal communication between each CNU and the CLT is guaranteed and the QoS is greatly enhanced.

The foregoing are only preferred embodiments of the present invention and are not intended to limit the protection scope of the present invention. Any modification, equivalent substitution, or improvement made without departing from the spirit and principle of the present invention should be covered by the protection scope of the present invention.

The invention claimed is:

1. A data transmission method, being applicable to a semi-duplex Ethernet Passive Coaxial-cable Network and the network comprising a CLT, Coaxial-cable Line Terminal, and at least one CNU, Coaxial-cable Network Unit; the CLT transmitting downlink data to each CNU in a preset downlink transmission period and each CNU transmitting uplink data to the CLT in a preset uplink transmission period; the preset uplink transmission period being shorter or equal to the period that clock synchronization can be kept by the CNU;

the method comprising:
sending, by the CLT, clock information to the CNU before the expiration of the period that the clock synchronization can be kept by the CNU, the clock information being adapted to make the clocks of the CNU and CLT be kept synchronized with each other within a period;
wherein the preset downlink transmission period comprises at least one preset minimum time slice which is shorter than or equal to the period that the clock synchronization can be kept by the CNU;
the sending the clock information to the CNU before the expiration of the period that the clock synchronization can be kept by the CNU comprises:
determining, by the CLT, whether there is a to-be-transmitted data frame at the starting point of each minimum time slice of the downlink transmission period, and if there is a to-be-transmitted data frame, sending the data frame which carried the clock information to each CNU; otherwise sending an idle signal which carried the dock information to each CNU in the minimum time slice.

2. The method according to claim 1, the method further comprising: when it is determined that there is a to-be-transmitted data frame,
determining, by the CLT, whether the time length for transmitting the to-be-transmitted data frame exceeds the length of the minimum time slice, if the time length for transmitting the to-be-transmitted data frame exceeds the length of the minimum time slice, sending the idle signal which carried the clock information to each CNU in the minimum time slice; otherwise, sending the data frame which carried the clock information to each CNU.

3. The method according to claim 1, further comprising:
synchronizing, by each CNU, the clock of the CNU according to clock information carried in the data frame or the idle signal sent from the CLT.

4. The method according to claim 1, wherein the length of the uplink transmission period equals to that of the minimum time slice.

5. The method according to claim 1, wherein the uplink transmission period is set by the CLT, and
the information of the uplink transmission period is sent to the CNU by the CLT via an existing or newly-defined control message.

6. The method according to claim 5, the method further comprising:
reporting, by each CNU, to the CLT the length of each uplink data frame to be transmitted; and
setting, by the CLT, the uplink transmission period according to the length of each uplink data frame to be transmitted by each CNU.

7. A data transmission system, comprising;
more than one CNU, Coaxial-cable Network Unit, adapted to transmit uplink data in a preset uplink transmission period, which is shorter than or equal to a period that clock synchronization can be kept by each CNU; and
a CLT, Coaxial-cable Line Terminal, adapted to transmit downlink data in a preset downlink transmission period, determine whether there is a to-be-transmitted data frame at starting point of each minimum time slice of the preset downlink transmission period, and if there is a to-be-transmitted data frame, send the data frame which carried the clock information to each CNU; otherwise send an idle signal which carried the clock information to each CNU in a minimum time slice, the clock information being adapted to make the clocks of the CNU and CLT be kept synchronized with each other within a period;
wherein the preset downlink transmission period comprises at least one preset minimum time slice which is shorter than or equal to the period that the clock synchronization can be kept by the CNU.

8. The system according to claim 7, wherein
the CLT is further adapted to obtain the period that the clock synchronization can be kept by the CNU, set the uplink transmission period which is shorter or equal to the period that the clock synchronization can be kept by the CNU, and send information of the set uplink transmission period to the CNU via an existing message or a newly-defined control message between the CLT and the CNU.

9. A CLT, Coaxial-cable Line Terminal, comprising:
a clock processing unit, adapted to send a transmitting triggering notification to a data receiving and transmitting processing unit when detecting the starting of a downlink transmission period, and send a receiving triggering notification to the data receiving and transmitting processing unit when detecting the starting of an uplink transmission period, the uplink transmission period being shorter than or equal to the period that clock synchronization can be kept by a CNU, Coaxial-cable Network Unit; and
the data receiving and transmitting processing unit, adapted to send downlink data which carried clock information to the CNU after receiving the transmitting triggering notification, and receiving uplink data sent from the CNU after receiving the receiving triggering notification,
the clock information being adapted to make the clocks of the CNU and CLT be kept synchronized with each other within a period;
wherein the data receiving and transmitting processing unit is further adapted to determine whether there is a to-be-transmitted data frame at starting point of each minimum time slice of the downlink transmission period after receiving the transmitting triggering notification, if there is the to-be-transmitted data frame, send the data frame which carried the clock information to the CNU; otherwise send an idle signal which carded the clock information to the CNU in the minimum time slice the minimum time slice being shorter than or equal to the period that the clock synchronization can be kept by the CNU.

10. The CLT according to claim 9, wherein the data receiving and transmitting processing unit is further adapted to after determining that there is an to-be-transmitted data frame at the starting point of each minimum time slice, determine whether the length of the to-be-transmitted data frame exceeds that of the minimum time slice, if the length of the to-be-transmitted data frame exceeds that of the minimum time slice, send an idle signal which carried the clock information to the CNU in the minimum time slice; otherwise, send the data frame which carried the clock information to the CNU.

11. The CLT according to claim 9, wherein the clock processing unit is further adapted to obtain the period that the clock synchronization can be kept by the CNU, set the uplink transmission period which is shorter than or equal to the period that the clock synchronization can be kept by the CNU, and send information of the set uplink transmission period to the data receiving and transmitting processing unit; and
the data receiving and transmitting processing unit is further adapted to send the received information of the uplink transmission period to the CNU via an existing or newly-defined control message between the CLT and the CNU.

* * * * *